(12) United States Patent
Gilbert (10) Patent No.: US 12,129,021 B2
(45) Date of Patent: Oct. 29, 2024

(54) TAIL-ROTOR VIBRATION DAMPENER SYSTEM

(71) Applicant: The Boeing Company, Chicago, IL (US)

(72) Inventor: Eric B. Gilbert, Seattle, WA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 17/658,176

(22) Filed: Apr. 6, 2022

(65) Prior Publication Data

US 2022/0380028 A1 Dec. 1, 2022

Related U.S. Application Data

(60) Provisional application No. 63/194,476, filed on May 28, 2021.

(51) Int. Cl.
| | | |
|---|---|---|
| *B64C 27/00* | (2006.01) | |
| *F15B 15/20* | (2006.01) | |
| *F15B 21/00* | (2006.01) | |

(52) U.S. Cl.
CPC ............ *B64C 27/001* (2013.01); *F15B 15/20* (2013.01); *F15B 21/008* (2013.01); *B64C 2027/004* (2013.01); *F15B 2211/63* (2013.01); *F15B 2211/8616* (2013.01)

(58) Field of Classification Search
CPC . B64C 27/001; B64C 2027/004; F15B 15/20; F15B 21/008; F15B 2211/63; F15B 2211/8616; F15B 2211/6303; F15B 21/12
See application file for complete search history.

(56) References Cited

U.S. PATENT DOCUMENTS

| | | | |
|---|---|---|---|
| 2015/0239569 A1* | 8/2015 | Gallet ................ | B64C 11/48 244/54 |
| 2017/0217575 A1* | 8/2017 | Welsh ................ | B64C 27/001 |
| 2020/0324883 A1* | 10/2020 | Smith ................ | F16F 13/22 |
| 2021/0291964 A1 | 9/2021 | Gilbert | |

* cited by examiner

*Primary Examiner* — Hussein Elchanti
*Assistant Examiner* — Shelley Marie Osterhout
(74) *Attorney, Agent, or Firm* — Quinn IP Law (57) ABSTRACT

A tail-rotor vibration dampener system for an aircraft is provided. The system includes a fuselage and an open rotor assembly including a powerplant and a set of rotor blades. The system further includes at least one actuator unit connecting the open rotor assembly to the fuselage. The actuator unit includes a hydraulic actuator controlling a position of the open rotor assembly in relation to the fuselage and a dampening device operable to cancel a vibration emanating from the open rotor assembly. The system further includes a computerized vibration dampening controller, including programming to determine a frequency of the vibration emanating from the open rotor assembly and control the dampening device to cancel the vibration emanating from the open rotor assembly based upon the frequency.

10 Claims, 6 Drawing Sheets

TAIL-ROTOR VIBRATION DAMPENER SYSTEM

CROSS-REFERENCE TO RELATED APPLICATION

The present application claims the benefit of priority to U.S. Provisional Application No. 63/194,476 filed May 28, 2021, which is hereby incorporated by reference in its entirety.

TECHNICAL FIELD

The concepts described herein relate to a tail-rotor vibration dampener system.

BACKGROUND

A fixed-wing aircraft utilizes thrust and lift in order to become and remain airborne. An airflow moving over the aircraft's external surfaces is affected by interaction with the external surfaces and may become turbulent or include variations in speed. Interaction with the airflow around or directly behind the fixed-wing aircraft may cause vibrations perceptible to occupants of the fixed-wing aircraft.

SUMMARY

Excess vibration within an aircraft fuselage decreases passenger satisfaction and increases wear upon the structure and equipment of the aircraft.

A tail-rotor vibration dampener system for an aircraft is provided. The system includes a fuselage and an open rotor assembly including a powerplant and a set of rotor blades. The system further includes at least one actuator unit connecting the open rotor assembly to the fuselage. The actuator unit includes a hydraulic actuator controlling a position of the open rotor assembly in relation to the fuselage and a dampening device operable to cancel a vibration emanating from the open rotor assembly. The system further includes a computerized vibration dampening controller, including programming to determine a frequency of the vibration emanating from the open rotor assembly and control the dampening device to cancel the vibration emanating from the open rotor assembly based upon the frequency.

A tail-rotor vibration dampener system for an aircraft includes a fuselage and an open rotor assembly including a powerplant operable to provide an output torque and a set of rotor blades receiving the output torque and concentrically rotating about a longitudinal axis of the open rotor assembly. The system further includes at least one actuator unit connecting the open rotor assembly to the fuselage, the actuator unit including a hydraulic actuator controlling a position of the open rotor assembly in relation to the fuselage and a dampening device operable to cancel a vibration emanating from the open rotor assembly. The system further includes a computerized vibration dampening controller, including programming to determine a frequency of the vibration emanating from the open rotor assembly and control the dampening device to cancel the vibration emanating from the open rotor assembly based upon the frequency.

In some embodiments, the dampening device includes an electrically activated hydraulic solenoid operable to create canceling vibrations within hydraulic fluid of the hydraulic actuator.

In some embodiments, the canceling vibrations are controlled to the frequency of the vibration emanating from the open rotor assembly and to an opposite phase of the vibration emanating from the open rotor assembly.

In some embodiments, the dampening device includes an electrically activated linear actuator operable to create canceling vibrations within hydraulic fluid of the hydraulic actuator.

In some embodiments, the canceling vibrations are controlled to the frequency of the vibration emanating from the open rotor assembly and to an opposite phase of the vibration emanating from the open rotor assembly.

In some embodiments, the system further includes a plurality of actuator units connecting the open rotor assembly to the fuselage.

In some embodiments, each of the plurality of actuator units includes a dampening device.

In some embodiments, the system further includes a sensor operable to monitor the vibration emanating from the open rotor assembly. In some embodiments, the computerized vibration dampening controller operating programming to determine the frequency of the vibration emanating from the open rotor assembly includes programming to monitor the sensor.

In some embodiments, the sensor is disposed within the open rotor assembly.

In some embodiments, the sensor is disposed upon a piston arm connected to the actuator unit.

In some embodiments, the system further includes a sensor operable to monitor a resulting vibration in the fuselage. In some embodiments, the computerized vibration dampening controller further operates programming to tune the dampening device based upon minimizing the resulting vibration in the fuselage.

According to one alternative embodiment, a tail-rotor vibration dampener system for an aircraft includes a fuselage and an open rotor assembly including a powerplant operable to provide an output torque and a set of rotor blades receiving the output torque and concentrically rotating about a longitudinal axis of the open rotor assembly. The system further includes a sensor operable to monitor a vibration emanating from the open rotor assembly and at least one actuator unit connecting the open rotor assembly to the fuselage. The actuator unit includes a hydraulic actuator controlling a position of the open rotor assembly in relation to the fuselage and an electrically activated hydraulic solenoid creating a vibration within hydraulic fluid of the hydraulic actuator and operable to cancel the vibration emanating from the open rotor assembly. The system further includes a computerized vibration dampening controller, including programming to determine a frequency of the vibration emanating from the open rotor assembly and control the electrically activated hydraulic solenoid to cancel the vibration emanating from the open rotor assembly based upon the frequency.

In some embodiments, the system further includes a plurality of actuator units connecting the open rotor assembly to the fuselage.

In some embodiments, each of the plurality of actuator units includes a dampening device.

According to one alternative embodiment, a tail-rotor vibration dampener system for an aircraft includes a fuselage and an open rotor assembly including a powerplant operable to provide an output torque and a set of rotor blades receiving the output torque and concentrically rotating about a longitudinal axis of the open rotor assembly. The system further includes a sensor operable to monitor a vibration emanating from the open rotor assembly and at least one actuator unit connecting the open rotor assembly to the fuselage. The actuator unit includes a hydraulic actuator controlling a position of the open rotor assembly in relation to the fuselage and an electrically activated linear actuator controlling an overall length of the actuator unit and operable to cancel the vibration emanating from the open rotor assembly. The system further includes a computerized vibration dampening controller, including programming to determine a frequency of the vibration emanating from the open rotor assembly and control the electrically activated linear actuator to cancel the vibration emanating from the open rotor assembly based upon the frequency.

In some embodiments, the system further includes a plurality of actuator units connecting the open rotor assembly to the fuselage.

In some embodiments, each of the plurality of actuator units includes a dampening device.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof.

An aircraft may include one or more primary engines and may further include an auxiliary tail mounted propeller, which may be described as an open rotor assembly. Such a tail mounted propeller may be powered by a combustion engine utilizing a petroleum-based fuel, of the tail mounted propeller may be powered by an electric machine powered by stored energy in an energy storage device such as a battery device. While in use, the tail mounted propeller spins in relation to the airframe and provides thrust in either a forward or rearward direction.

Noise and vibration may be transmitted through an airframe. A propeller mounted in a forward orientation, with a powerplant for the propeller located behind the propeller. The propeller in the forward orientation may be mounted to a wing of the aircraft or at a foremost position upon the fuselage and may spin in an initially undisturbed airflow. As a result, such a propeller mounted in a forward orientation tends to create a constant or steady-tone vibration.

A tail mounted propeller may be mounted at a rearmost end of a fuselage and may be mounted in a rearward orientation, with at least a powerplant for the tail mounted propeller located in front of the tail mounted propeller. In addition, aircraft structures such as wings, stabilizers, pylons, and struts may be located in front of the tail mounted propeller. As a result, the tail mounted propeller, when spinning, may cyclically transition between boundary layers of airflow created by the aircraft structure. For example, a tail mounted propeller disposed upon a rearmost end of a fuselage may transition fan blades through three different sets of boundary layers, a first set created by a first wing/first horizontal stabilizer pairing (the boundary layer resulting from first the first wing and then the first horizontal stabilizer impacting a same or nearly a same portion of the airflow flowing past the airplane), a second set created by a vertical stabilizer, and a third set created by a second wing/second horizontal stabilizer pairing (the boundary layer resulting from first the first wing and then the first horizontal stabilizer impacting a same or nearly a same portion of the airflow flowing past the airplane.) Vibrations transmitted by the tail mounted propeller may change or pulsate every time one of the fan blades pass in or out of one of the boundary layers. This variable or pulsating vibrations may be transmitted through the structure of the plane as perceptible vibrations and/or audible sounds to passengers within the airplane. The airflow pattern through which the fan blades of a tail mounted propeller passes may be described as a variable pressure field aft of the stabilizers.

In one embodiment, wherein a tail mounted propeller with two sets of rotor blades rotating about a single axis in a variable pressure field aft of two horizontal stabilizers and a single vertical stabilizer, a frequency tone ($F_{tone}$) of vibrations emanating from the tail mounted propeller may be estimated or predicted by the following equation.

$$F_{tone} = \frac{RPM * 3 * (X + Y)}{60} \quad (1)$$

wherein $F_{tone}$ is provided in Hz, RPM is a rotational speed of the two sets of rotor blades, the value the corresponds to the number of stabilizers creating boundary layers, and X and Y are numbers of rotor blades for each of the two sets of rotor blades, respectively. Once a vibration frequency emanating from a tail mounted propeller (or an open rotor assembly, as described herein) is determined, a vibration dampening device or a dampening device may be controlled to create a vibration to cancel the vibration emanating from the tail mounted propeller. The created vibration may be a same frequency as and an opposite phase to the vibration emanating from the tail mounted propeller. In some embodiments, setting the created vibration to an opposite phase may include monitoring a resulting vibration (a sum of the vibration emanating from the tail mounted propeller and the created vibration) through a sensor disposed and operable to monitor the resulting vibration, and tuning the frequency and/or phase of the created frequency to minimize the resulting vibration.

Figure 1:
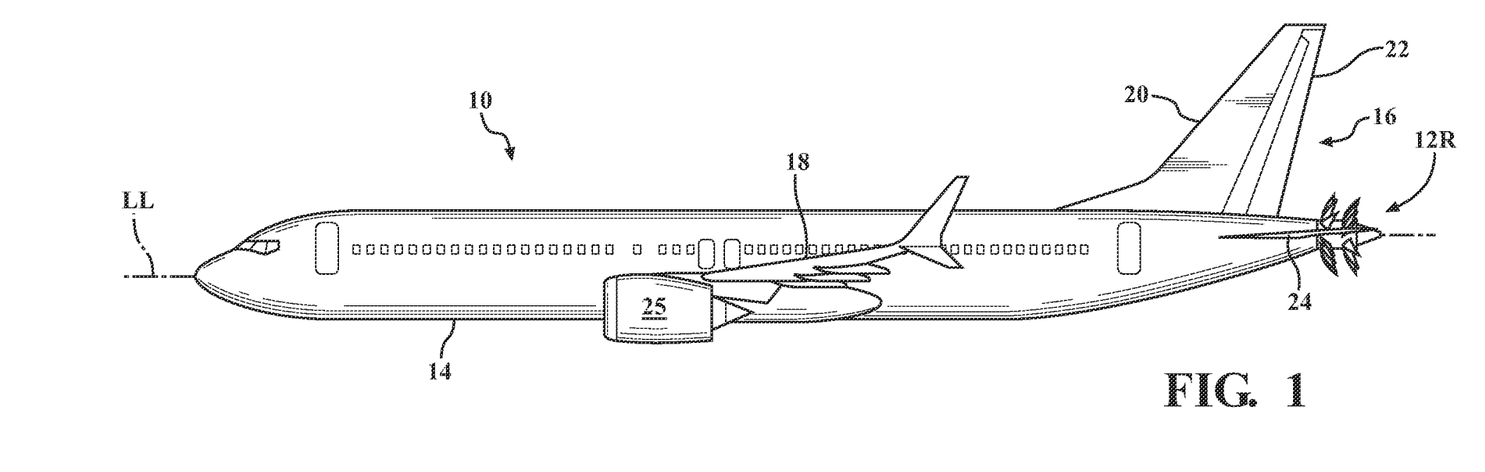
FIGS. 1 and 2 are schematic perspective view illustrations of an exemplary fixed-wing aircraft in two representative phases of flight, with the aircraft having a boundary layer ingestion-open rotor system constructed and controlled as set forth herein, in accordance with the present disclosure.

Referring to the drawings, wherein like reference numbers refer to like features throughout the several views, a fixed-wing aircraft 10 is illustrated in FIG. 1 having an open rotor assembly 12R. The open rotor assembly 12R is used as part of a boundary layer ingestion-open rotor system 12, the latter of which is shown schematically in FIGS. 5 and 6. The exemplary aircraft 10 is represented as a twin jet mid-range passenger aircraft in FIGS. 1 and 2 solely for illustration of the present teachings. Larger or smaller embodiments of the aircraft 10 may be envisioned within the scope of the disclosure, with the particular location of one or more main propulsion engines 25 possibly varying with the application.

The aircraft 10 in its various embodiments includes a fuselage 14 with a longitudinal centerline LL. The aircraft 10 also includes a tail assembly or empennage 16 and a pair of wings 18 each connected to and extending radially from the fuselage 14. The empennage 16 in the illustrated embodiment includes various structural components and associated flight control surfaces, including a vertical stabilizer 20 with a main rudder 22 disposed thereon, and horizontal stabilizers 24 with a set of elevators (not shown). Trim tabs (not shown) may also be included as part of the flight control surfaces of the empennage 16 in order optimize control and responsiveness of the aircraft 10 while in flight. Although not visible from the perspectives of FIGS. 1 and 2, the wings 18 likewise include various flight control surfaces situated along the leading and trailing edges of the wings 18 and other surfaces thereof, including flaps, ailerons, spoilers, and slats. Collectively, the flight control surfaces of the aircraft 10 enable the aircraft 10 to maneuver while being propelled through the air by main propulsion engines 25, typically in the form of large gas turbine engines or wing-mounted turbofans.

Figure 2:
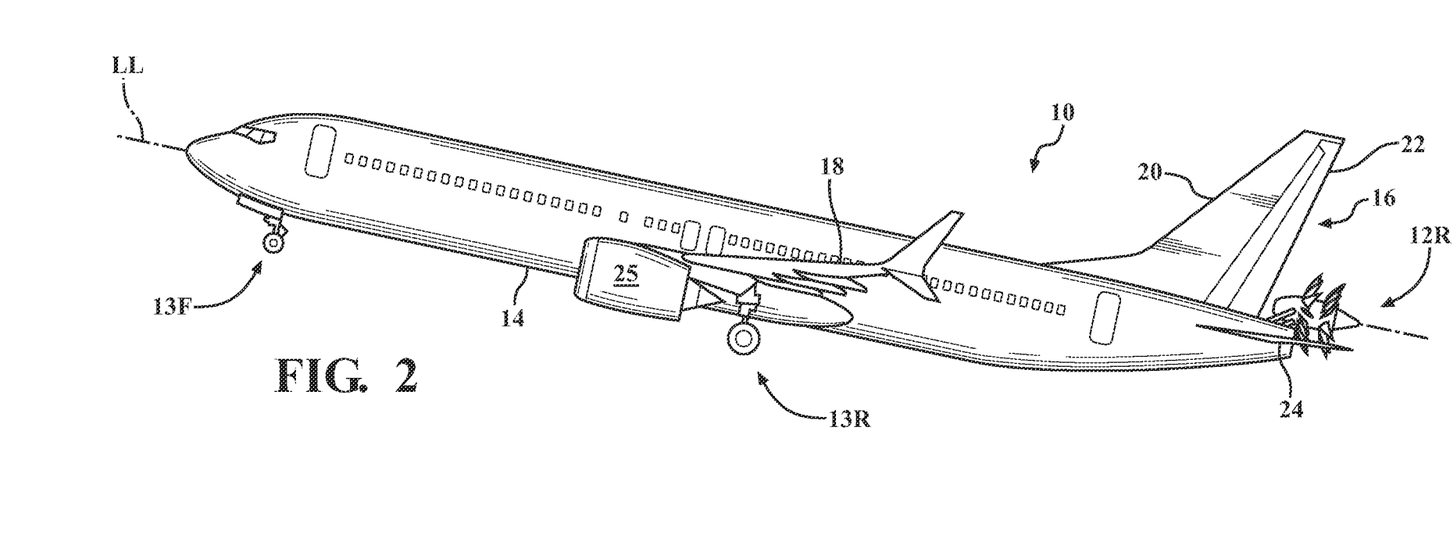

FIGS. 1 and 2 illustrate two different phases of flight of the representative fixed-wing aircraft 10. In FIG. 1, the aircraft 10 is shown from the side during a steady-state cruise phase. Such a cruise phase is typically reached and sustained once the aircraft 10 levels off at a predetermined altitude and settles into a steady-state airspeed. In the illustrated cruise phase of FIG. 1, front and rear landing gear assemblies 13F and 13R of the aircraft 10, shown in a deployed state in FIG. 2, are fully retracted and stowed within the fuselage 14. The main propulsion engines 25 in a cruise phase are typically throttled back to conserve fuel. During cruise, therefore, the open rotor assembly 12R is positioned along the longitudinal centerline LL of the fuselage 14 aft of the empennage 16 so that the open rotor assembly 12R is situated within the pre-identified boundary layer flowing around the fuselage 14. Such a boundary layer may be pre-identified as part of the present strategy using, for instance, wind tunnel testing, simulation, or other suitable techniques, as will be appreciated by those of ordinary skill in the art.

FIG. 2 illustrates the same fixed-wing aircraft 10 during takeoff or landing, i.e., with its landing gear assemblies 13F and 13R fully deployed and main propulsion engines 25 providing propulsive thrust. The pitch of the aircraft 10 during takeoff and landing is such that the open rotor assembly 12R, if left in the position of FIG. 1, could be left vulnerable to contact with a runway surface or other objects in the vicinity of the aircraft 10. Therefore, the open rotor assembly 12R may be configured as set forth below to translate between the representative positions of FIGS. 1 and 2 or anywhere in between.

Figure 5:
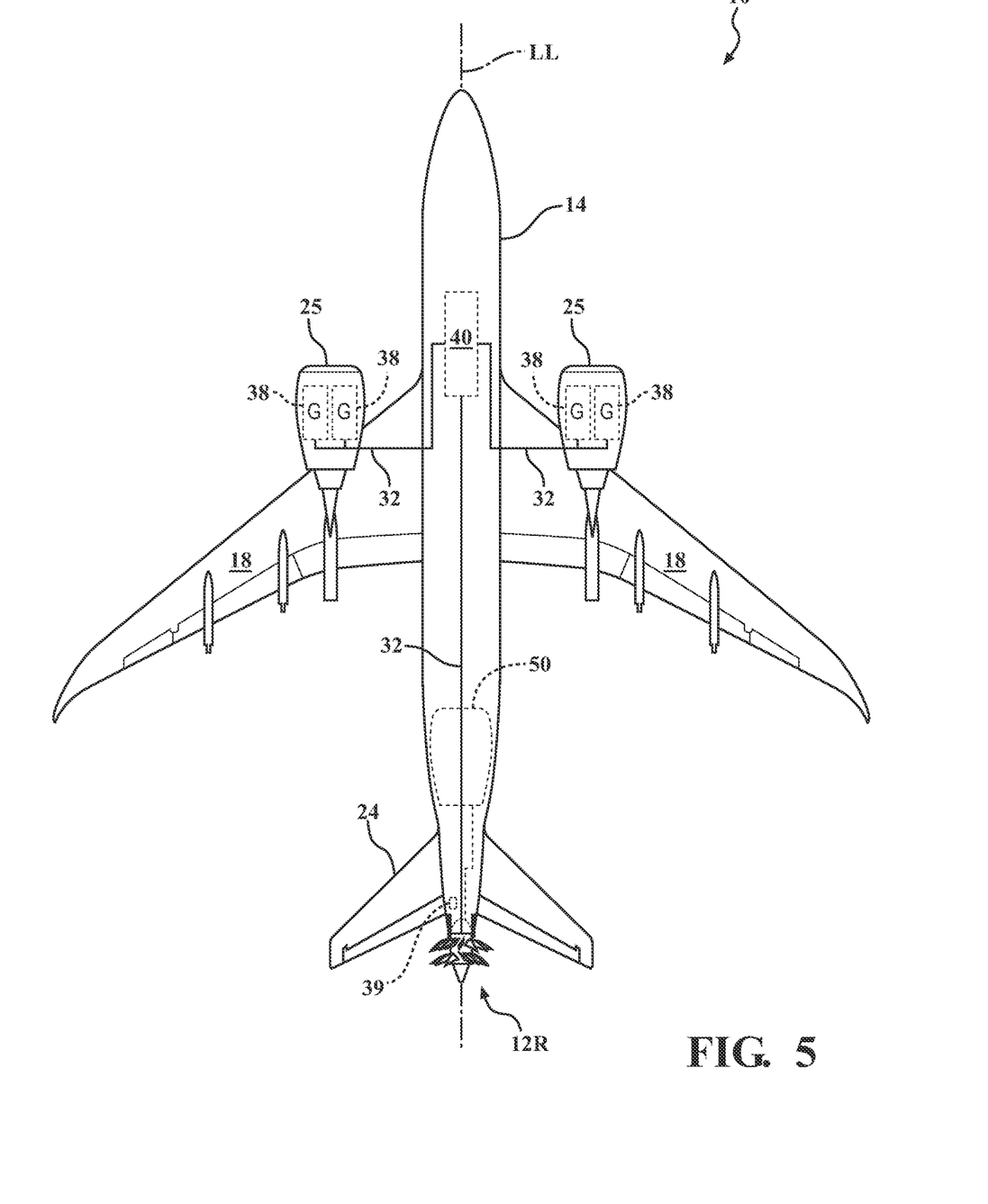
FIG. 5 is a schematic plan view illustration of the exemplary fixed-wing aircraft of FIG. 1 illustrating a possible electrical system configuration, in accordance with the present disclosure.
Figure 6:
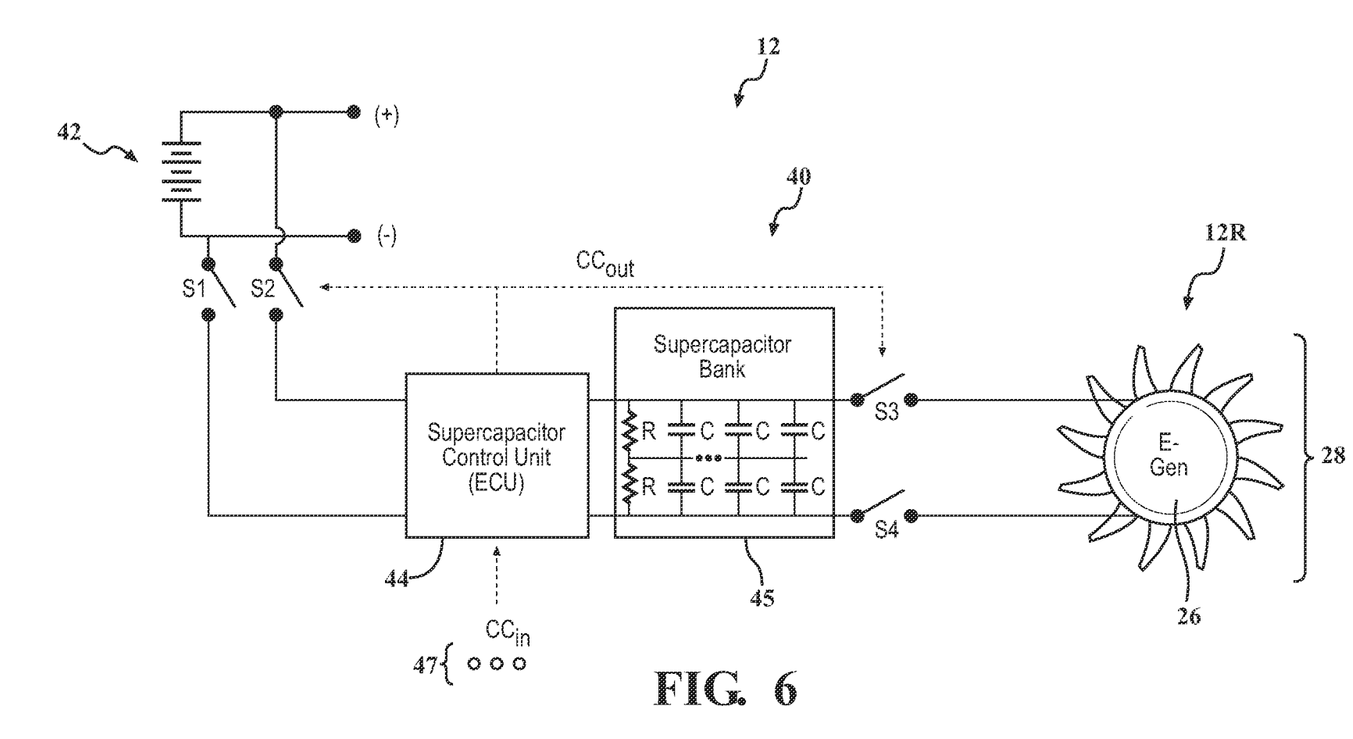
FIG. 6 is a schematic electrical circuit diagram for implementing the exemplary embodiment of FIG. 5, in accordance with the present disclosure.

For example, the position of the open rotor assembly 12R relative to the longitudinal centerline LL of the fuselage 14 may be automatically coordinated with the current deployment state of the landing gear assemblies 13F and 13R, and/or the position relative to the longitudinal centerline LL may be queued by flight sensor data in various embodiments using the flight sensors 47 of FIG. 6. When the landing gear assemblies 13F and 13R are lowered, the open rotor assembly 12R may automatically translate upward, possibly using available hydraulic power from a main hydraulic system 50 of the aircraft 10 (see FIG. 5), so that the open rotor assembly 12R clears the runway by an allowable margin during takeoff and landing. Such a capability may also help improve the performance of a reverse thrust efflux performance as described below.

Open rotor assembly 12R as illustrated in FIGS. 1 and 2 includes a tail mounted propeller mounted in a rearward orientation. Airflow passing over the horizontal stabilizers 24 and the vertical stabilizer 20 create a variable pressure field aft of the stabilizers, such that fan blades of the open rotor assembly 12R pass cyclically through boundary layers and cause a pulsating vibration to be transmitted throughout the structure of aircraft 10. In one embodiment, open rotor assembly 12R is connected to fuselage 14 through one or more hydraulic actuators operable to change a position of the open rotor assembly 12R.

Open rotor assembly 12R may be mounted to aircraft 10 with isolating mounts such that vibrations from the open rotor assembly 12R may be prevented from being transmitted to a rest of the aircraft 10 or mitigated. In one embodiment, the hydraulic actuator or actuators utilized to change the position of the open rotor assembly 12R may be equipped with a high-power speaker motor or solenoid operable to create vibrations within an actuator body of the hydraulic actuator. These vibrations within the hydraulic actuator may be tuned or controlled to be out of phase or 180 degrees opposite to the pulsating vibrations of the open rotor assembly 12R, such that the vibrations of the open rotor assembly 12R may be canceled or mitigated.

In another embodiment, a linear displacement motor may be disposed upon a piston arm of the hydraulic actuator. The linear displacement motor may be operable to change a length of the piston arm. The linear displacement motor may be operable to create vibrations in the piston arm. These vibrations in the piston arm may be tuned or controlled to be out of phase or 180 degrees opposite to the pulsating vibrations of the open rotor assembly 12R, such that the vibrations of the open rotor assembly 12R may be canceled or mitigated.

Figure 3:
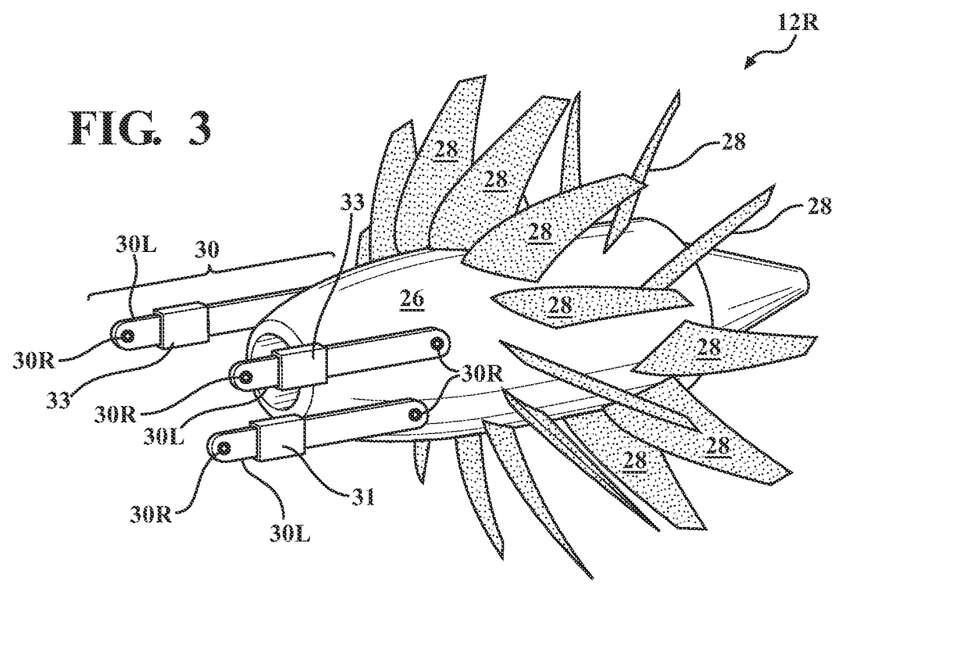
FIGS. 3 and 4 are schematic perspective view illustrations of two different deployed positions of an open rotor assembly usable as part of the system shown in FIGS. 1 and 2, in accordance with the present disclosure.
Figure 4:
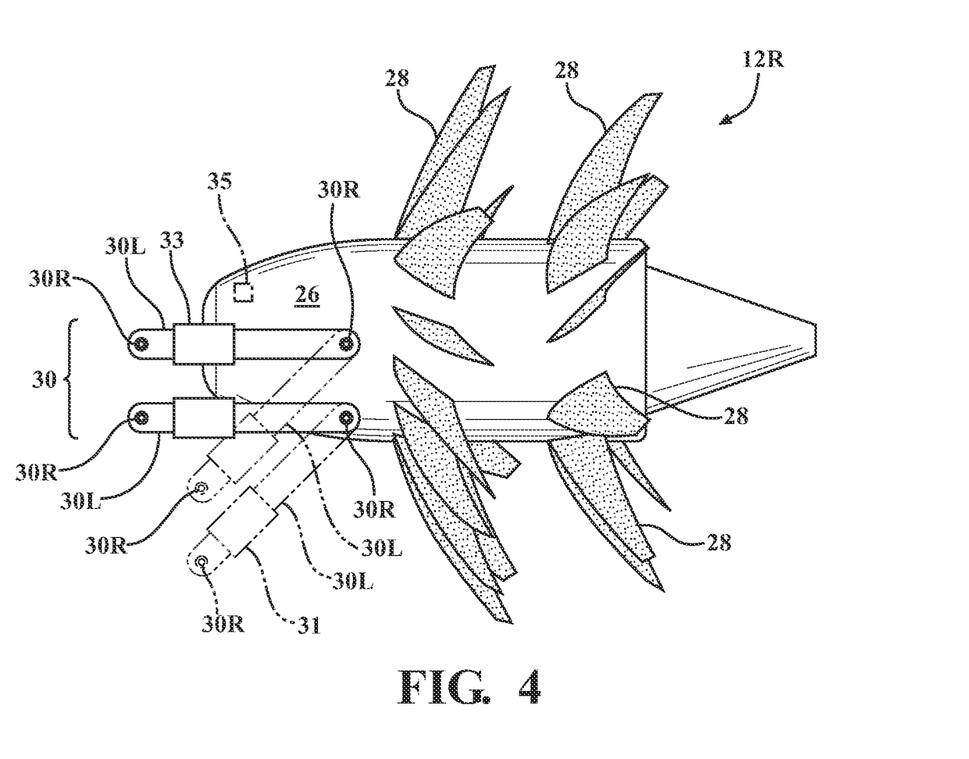

Referring to FIGS. 3 and 4, the open rotor assembly 12R includes a powerplant 26 and a plurality of fan blades 28. The fan blades 28 are connected to and extend radially outward from the powerplant 26. A mechanical linkage assembly 30 couples the powerplant 26 to the fuselage 14 aft of the empennage 16 as best shown in FIGS. 1 and 2. Coupling of the open rotor assembly 12R to the fuselage 14 occurs within a predefined boundary layer of airflow around the aircraft 10, with boundary layer physics well understood in the aeronautical arts and described in general hereinabove. The mechanical linkage assembly 30 may be configured as an articulated linkage assembly as shown in order to enable the open rotor assembly 12R to be fully raised (FIG. 4) or lowered (FIG. 3) relative to the centerline LL as needed. To that end, the number of linkages 30L and revolute joints 30R of the mechanical linkage assembly 30 may vary within the scope of the application. In the embodiment of FIGS. 3 and 4, three linkages 30L and revolute joints 30R are illustrated. A bottom of the linkages 30L is illustrated including an actuator unit 31. Each of the two upper linkages 30L are illustrated including an actuator unit 33. The power utilized for raising or lowering the open rotor assembly 12R may be provided to the actuator unit 31 and the actuator units 33, as noted above, by onboard hydraulic pressure lines of the main hydraulic system 50 of FIG. 5 in some embodiments to take advantage of available onboard power.

The system 12 described in detail herein is intended to ingest and recapture energy from the pre-identified boundary layer around the fuselage 14, and to erase some of the boundary layer-induced parasitic drag on the aircraft 10. As will be appreciated by those of ordinary skill in the art, open rotors or turboprops are generally considered to be more energy efficient than shrouded turbofans of the types typically used as the main propulsion engines 25 of FIGS. 1 and 2. However, open rotor configurations also tend to be relatively noisy, and thus the illustrated position of the open rotor assembly 12R aft of the empennage 16 may help reduce noise as perceived within the aircraft 10. Additionally, the adjustable pitch of the fan blades 28 of FIGS. 3 and 4 enables pitch to be modified or feathered in flight based on the present airspeed and altitude of the aircraft 10, unlike shrouded inductive fans, which in turn provides distinct passive charging or generating advantages as described below.

A sensor 35 is illustrated in FIG. 4. The sensor 35 may be provided at various locations and provides data related to operation of the open rotor assembly 12R. The sensor 35 may provide data related to vibrations generated within the open rotor assembly 12R, for example, by measuring vibrations directly. The sensor 35 may alternatively provide data related to operation of the open rotor assembly 12R, such as an angular position of each set of fan blades, such that vibrations emanating from the open rotor assembly 12R may be predicted.

Referring to FIG. 5, active rotation of the open rotor assembly 12R may, in some embodiments, be electrically powered via an onboard electrical system 40. A typical aircraft may include an auxiliary power unit (APU) (not shown), which is used to generate onboard electrical power via the combustion of jet fuel. Power from an APU may be used at the gate or selectively during other flight phases to generate onboard electricity, albeit at the cost of reduced fuel efficiency. The electrical system 40 of FIG. 5, which may be used to eliminate or at least reduce the size and/or usage of such an APU, is electrically connected via transfer conductors 32 to a set of engine-mounted or wing-mounted electric generators (G) 38, as well as to the open rotor assembly 12R located at the rear of the fuselage 14.

Different electrical functions aboard the fixed-wing aircraft 10 of FIG. 5 may utilize the supply of electrical energy from the electrical system 40. Onboard systems requiring electrical power range from flight sensors and avionics, cabin lighting and passenger infotainment systems, heating and cooling systems for regulating the temperature of the passenger cabin, or heating/cooling functions utilized for in-flight food and beverage service, etc. A particularly energy-intensive electrical load is that of in-flight de-icing or anti-icing systems. As a result of the periodically high loads imposed by these and other possible electrical loads aboard the aircraft 10, the exemplary electrical system 40 is typically sized for a worst-case demand scenario. However, as wing de-icing and other energy-intensive functions are not always performed, ample opportunity remains for the electrical system 40 to take advantage of possible energy reserves in order to selectively energize the present boundary layer ingestion functions. That is, the electrical system 40 may be configured to load manage, with motoring functions of the open rotor assembly 12R being performed when electrical energy or state of charge is present in the electrical system 40 to do so. Likewise, generating modes may be commanded when the state of charge is lower than an allowable threshold.

Additionally, the system 12 and its ability to passively charge the electrical system 40 during certain flight phases may reduce or eliminate the need for energy-intensive thrust reversal functions of the type ordinarily performed by the main propulsion engines 25. For example, a pilot or an onboard flight controller may execute a thrust reversal maneuver to thereby cause the main propulsion engines 25 to redirect engine exhaust during landing maneuvers in order to rapidly reduce ground speed. As thrust reversal maneuvers consume significant fuel, selective thrust reversal capabilities of the present system 12 may be used to reduce or eliminate engine-based thrust reverse aboard the disclosed aircraft 10.

The fuselage 14 may include a sensor 39 operable to monitor a resulting vibration affecting the fuselage 14 as a result of operation of the open rotor assembly 12R and the actuator unit(s) 31 and actuator unit(s) 33. In one embodiment, the sensor 39 may be operable to provide data useful to tune a frequency and or phase of a created vibration in the dampening devices to minimize a resulting vibration.

Referring to FIG. 6, the electrical system 40 according to a possible embodiment includes at least one energy storage system, with two energy storage systems illustrated as a representative high-energy multi-cell battery pack 42 and a supercapacitor bank 45. As noted below, non-electrical embodiments may be envisioned within the scope of the disclosure in which the energy in the energy storage system (s) is s store of chemical energy, e.g., a supply of combustible diesel/kerosene-based aviation fuel such as Jet-A, Jet-A1, Jet-B, etc., or which may be used when the open rotor assembly 12R is alternatively embodied as an open rotor gas turbine. In the illustrated electrical embodiment, the battery pack 42 and the supercapacitor bank 45 are connected across positive (+) and negative (−) rails of a direct current voltage bus. The individual battery cells of the battery pack 42 may be variously configured as rechargeable battery cells of an aviation-suitable battery chemistry, e.g., lithium-ion or another battery chemistry providing the energy density useful for performing the tasks described herein. The energy storage system(s) are electrically or mechanically connectable to the powerplant 26 in different embodiments and are configured to discharge or otherwise release energy in response to control signals to thereby selectively rotate the powerplant 26 within the predefined boundary layer.

Although omitted for illustrative simplicity, the open rotor assembly 12R may be configured as a rotary electric machine that rotates when energized by the controlled discharge of the battery pack 42 and/or the supercapacitor bank 45. Different embodiments of the open rotor assembly 12R may be envisioned within the scope of the present disclosure, including but not limited to brushless or brush-type direct current (DC) motors or polyphase machines, e.g., permanent magnet-based or induction-based machines. For polyphase machines, one of ordinary skill in the art will appreciate that DC power supplied by the battery pack 42 and/or the supercapacitor bank 45 must first be inverted to an alternating current (AC) voltage, typically using pulse width modulation or other high-speed switching control of an inverter module (not shown). Therefore, the circuit topology of FIG. 6 is intended to be illustrative of aspects of the present teachings, particularly with respect to the structure and function of the battery pack 42 and the supercapacitor bank 45, without limiting the scope of the disclosure to a particular motor/generator construction of the open rotor assembly 12R.

Connection/disconnection of the energy storage systems of FIG. 6 respectively to or from the open rotor assembly 12R, shown as an electrical generator (E-Gen) in the illustrated embodiment, occurs in response to electronic control signals (arrow $CC_{OUT}$). The electronic control signals (arrow $CC_{OUT}$) are generated and transmitted by an electronic control unit (ECU) 44 of the electrical system 40 during one or more predetermined phases of flight. The electronic control signals (arrow $CC_{OUT}$) may be used to open or close high-voltage solid state or mechanical switches S1, S2, S3, and S4 as needed in order to respectively disconnect or connect the battery pack 42 and/or the supercapacitor bank 45 from or to the open rotor assembly 12R. Additional electronic signals (arrow $CC_{IN}$) are illustrated being provided by the flight sensors 47 to the electronic control unit (ECU) 44.

For instance, the switches S1 and S2 upstream of the ECU 44 may be commanded open as shown to automatically disconnect the battery pack 42 and thus prevent energy from passing to or from the battery pack 42. In a similar manner, the switches S3 and S4 may be commanded open as shown to disconnect the supercapacitor bank 45. The switches S1 and S2 may be commanded closed to reconnect the battery pack 42, while the S3 and S4 are commanded closed to reconnect the supercapacitor bank 45. Additional switches or a different switching topology may be used to achieve the desired ends, and thus the topology of FIG. 6 is non-limiting and representative of the present teachings.

In the illustrated configuration, the battery pack 42 and/or the open rotor assembly 12R may be used to electrically charge an application-suitable number of capacitors (C) housed within the supercapacitor bank 45. The capacitors (C) are connected in electrical parallel with multiple resistors (R) and possibly other electromagnetic interference or other signal filtering components, as will be appreciated by those of ordinary skill in the art. A supercapacitor bank 45 constructed in this manner may be used for various purposes aboard the aircraft 10, including use as a reliable reserve of electrical power to quickly energize onboard systems in the event of transient voltage dips or high load periods.

The ECU 44, which is also labeled "Supercapacitor Control Unit" in FIG. 6, is in communication with the energy storage system(s) and the open rotor assembly 12R, e.g., over hardwired differential voltage lines or another suitable wired or wireless connection. The ECU 44 is configured to selectively transmit the electronic control signals (arrow $CC_{OUT}$) to the energy storage system(s) to thereby energize the system 12 during the one or more predetermined flight phases of the aircraft 10 shown in FIGS. 1 and 2.

While illustrated as a unitary control module for simplicity, the ECU 44 may be physically embodied as one or more electronic control units or nodes each with application-sufficient memory and one or more processors, associated hardware and software such as a clock, timer, input/output circuitry, buffer circuitry, and the like. Memory may include read only memory, for instance magnetic or optical memory. Instructions embodying a control method may be programmed as computer-readable instructions and executed during operation of the aircraft 10. The term "ECU" may include one or more control modules, logic circuits, Application Specific Integrated Circuits (ASICs), central processing units, microprocessors, or other hardware as needed to provide the programmed functionality described herein.

It is expected that transient operation of the system 12 of the present disclosure, during the indicated phases of flight and for the purposes and durations noted herein, should require relatively low power consumption levels. Electrical energy provided by operation of the main propulsion engines 25 is relatively expensive to produce, requiring as it does the combustion of amounts of jet fuel. When the aircraft 10 levels off into cruise as illustrated in FIG. 1, the main engines 25 of the aircraft 10 are typically throttled back to conserve fuel. During such a time, the open rotor assembly 12R may be operated as an electric motor that intermittently draws low power from the battery pack 42 of FIG. 5.

For example, during cruise the open rotor assembly 12R may be driven at relatively low power by operation of engine generators 38 of FIG. 5, which are typically located on and driven by the main engines 25. During such a flight phase, rotation of the open rotor assembly 12R within the boundary layer formed around the fuselage 14 counteracts boundary layer-induced wake drag. That is, the energized open rotor assembly 12R rotates within the boundary layer aft of the empennage 16 of FIGS. 1 and 2 to cancel out parasitic drag. Likewise, the open rotor assembly 12R may be triggered to operate as an electric generator in other modes, such as during descent of the aircraft 10. During such a generating mode, the airflow-induced passive rotation of the blades 28 and the connected powerplant 26 may enable the open rotor assembly 12R to function as a wind turbine, with such passive rotation used to generate electricity for recharging the supercapacitor bank 45 and/or the individual battery cells of the battery pack 42.

Figure 7:
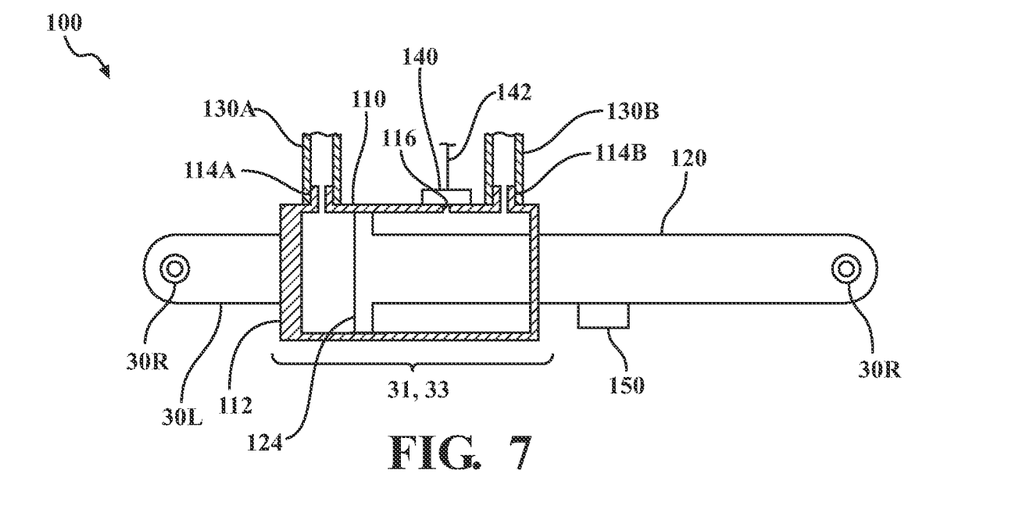
FIG. 7 schematically illustrates a first embodiment of an actuator unit including a dampening device embodied as an electrically activated hydraulic solenoid, in accordance with the present disclosure.

FIG. 7 schematically illustrates a first embodiment 100 of an actuator unit 31 and/or actuator unit 33 including a dampening device embodied as an electrically activated hydraulic solenoid 140. A linkage 30L and two revolute joints 30R are illustrated. An actuator unit 31 and/or actuator unit 33 of FIGS. 3 and 4 may be defined in accordance with the embodiment of FIG. 7 to include a hydraulic actuator 110 equipped with an electrically activated hydraulic solenoid 140. The hydraulic actuator includes a hydraulic body portion 112 operable to be filled with hydraulic fluid, wherein the hydraulic fluid controls extension and retraction of a piston arm 120 which controls a position of an attached open rotor assembly 12R. A first hydraulic port 114A enables pressurized hydraulic fluid to be pumped from hydraulic supply line 130A into a first side of the body portion 112 to exert force upon plunger seal 124 of the piston arm 120 and extend the piston arm 120 to a right direction in the illustration. A second hydraulic port 114B enables pressurized hydraulic fluid to be pumped from hydraulic supply line 130B into a second side of the body portion 112 to exert force upon plunger seal 124 of the piston arm 120 and retract the piston arm 120 to a left direction in the illustration. By controlling hydraulic fluid pressures within the hydraulic supply line 130A and the hydraulic supply line 130B, an overall length of the linkage 30L connecting the two revolute joints 30R may be controlled. By controlling the length of linkage 30L, a position of the open rotor assembly 12R may be controlled.

The electrically activated hydraulic solenoid 140 may be operable to function as a speaker motor, similar to an audio speaker device, moving a diaphragm 116 within the electrically activated hydraulic solenoid 140 to create vibrations within the hydraulic fluid within body portion 112. By tuning or controlling vibrations within the body portion 112 of the hydraulic actuator 110, the actuator unit 31 and/or the actuator unit 33 may cancel or mitigate vibrations emanating from the open rotor assembly 12R, preventing the vibrations from the open rotor assembly 12R from causing vibrations and/or sound within the fuselage 14. Electrical connection 142 is illustrated connecting electrically activated hydraulic solenoid 140 to data and power systems of the aircraft 10.

A sensor 150 is illustrated attached to the piston arm 120. The sensor 150 may be utilized in addition to or in the alternative to the sensor 35 of FIG. 4. The sensor 150 is operable to monitor vibrations within the piston arm 120. In another embodiment, the sensor 150 may be disposed within the fuselage 14 in order to provide feedback control based upon reducing a sensed vibration within the fuselage 14.

Figure 8:
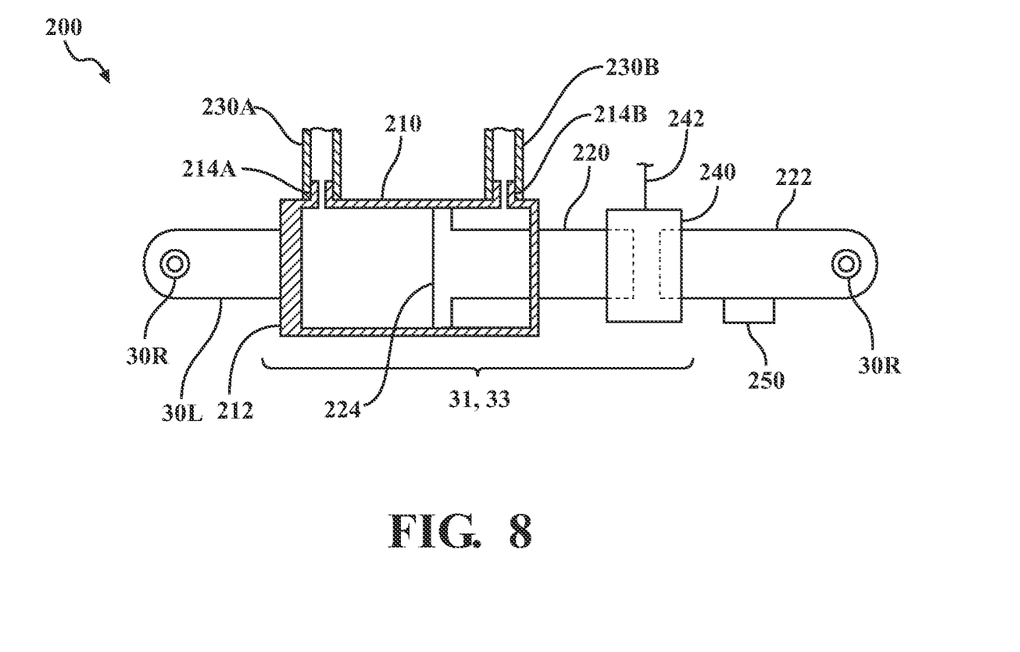
FIG. 8 schematically illustrates a second embodiment of an actuator unit including a dampening device embodied as an electrically activated linear actuator, in accordance with the present disclosure.

FIG. 8 schematically illustrates a second embodiment 200 of an actuator unit 31 and/or actuator unit 33 including a dampening device embodied as an electrically activated linear actuator 240. A linkage 30L and two revolute joints 30R are illustrated. An actuator unit 31 and/or actuator unit 33 of FIGS. 3 and 4 may be defined in accordance with the embodiment of FIG. 8 to include a hydraulic actuator 210 equipped with an electrically activated linear actuator 240. The hydraulic actuator includes a hydraulic body portion 212 operable to be filled with hydraulic fluid, wherein the hydraulic fluid controls extension and retraction of a piston arm 220 which controls a position of an attached open rotor assembly 12R. A first hydraulic port 214A enables pressurized hydraulic fluid to be pumped from hydraulic supply line 230A into a first side of the body portion 212 to exert force upon plunger seal 224 of the piston arm 220 and extend the piston arm 220 to a right direction in the illustration. A second hydraulic port 214B enables pressurized hydraulic fluid to be pumped from hydraulic supply line 230B into a second side of the body portion 212 to exert force upon plunger seal 224 of the piston arm 220 and retract the piston arm 220 to a left direction in the illustration. By controlling hydraulic fluid pressures within the hydraulic supply line 230A and the hydraulic supply line 230B, an overall length of the linkage 30L connecting the two revolute joints 30R may be controlled. By controlling the length of linkage 30L, a position of the open rotor assembly 12R may be controlled.

The electrically activated linear actuator 240 may connect and control a distance between the piston arm 220 and a piston arm extension 222, thereby providing additional control over a total length of the linkage 30L/a length of the actuator unit. By cyclically modulating an overall length of the linkage 30L, vibrations within the piston arm 220 may be controlled. By tuning or controlling vibrations within the piston arm 220, the actuator unit 31 and/or the actuator unit 33 may cancel or mitigate vibrations emanating from the open rotor assembly 12R, preventing the vibrations from the open rotor assembly 12R from causing vibrations and/or sound within the fuselage 14. Electrical connection 242 is illustrated connecting electrically activated linear actuator 240 to data and power systems of the aircraft 10.

A sensor 250 is illustrated attached to the piston arm extension 222. The sensor 250 may be utilized in addition to or in the alternative to the sensor 35 of FIG. 4. The sensor 250 is operable to monitor vibrations within the piston arm extension 222. In another embodiment, the sensor 250 may be disposed within the fuselage 14 in order to provide feedback control based upon reducing a sensed vibration within the fuselage 14.

Figure 9:
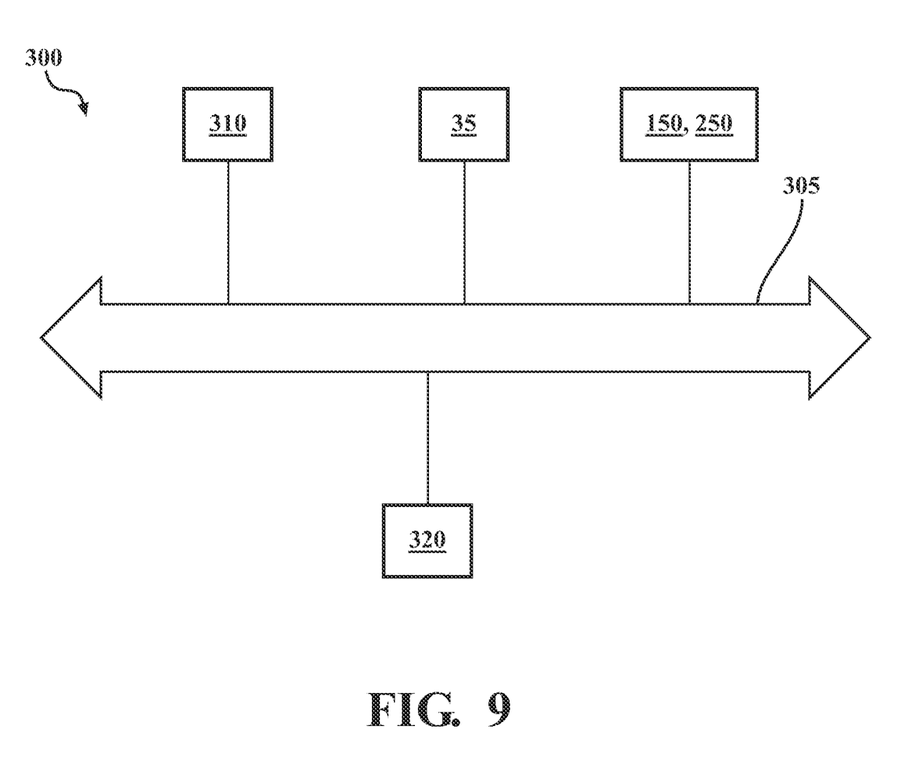
FIG. 9 schematically illustrates an aircraft data system including a communication bus device, in accordance with the present disclosure.

FIG. 9 schematically illustrates an aircraft data system 300 including a communication bus device 305. The communication bus device 305 is operable to permit data transfer between any connected electronic device. A computerized vibration dampening controller 310 is illustrated electronically connected to the communication bus device 305. Additionally, the sensor 35 and the sensor 150 and/or the sensor 250 (depending upon which embodiment of actuator unit is being utilized) are illustrated electronically connected to the communications bus device. A computerized aircraft systems controller 320 may additionally be connected to the communication bus device 305.

The computerized vibration dampening controller 310 and the computerized aircraft systems controller 320 each include a processing device operable to execute programmed code. The processing device may include memory, e.g., read only memory (ROM) and random-access memory (RAM), storing processor-executable instructions and one or more processors that execute the processor-executable instructions. In embodiments where the processing device includes two or more processors, the processors may operate in a parallel or distributed manner. The processing device may execute an operating system. The processing device may include one or more modules executing programmed code or computerized processes or methods including executable steps. Illustrated modules may include a single physical device or functionality spanning multiple physical devices.

The computerized vibration dampening controller 310 may include a vibration canceling software module which includes executable code operable to monitor, determine, or predict a frequency or set of frequencies of vibration being generated by the open rotor assembly 12R and provide command instructions to the actuator unit(s) 31 and/or actuator unit(s) 33 to generate vibration canceling effects within the actuator unit(s). The frequency may be determined or predicted based upon a speed of a powerplant of the open rotor device, for example, according to Equation 1, disclosed herein. The frequency may be alternatively detected or monitored by one or more sensors, as disclosed herein.

The computerized aircraft systems controller 320 may include data related to operation of the aircraft 10, such as engine/powerplant settings, air speed, and other data that may be useful to determine or predict how to best cancel vibrations in an actuator unit.

Operation of the disclosed system may be described as steps of an exemplary method. For example, a method may include connecting an open rotor assembly to a fuselage of an aircraft with an actuator unit including a hydraulic actuator operable to control a position of the open rotor assembly and a dampening device operable to cancel vibrations emanating from the open rotor assembly. The method further includes, within a computerized processor, determining a frequency of the vibration emanating from the open rotor assembly and controlling the dampening device to cancel the vibration emanating from the open rotor assembly based upon the frequency. Canceling the vibration emanating from the open rotor assembly may include matching the frequency of the vibration emanating from the open rotor assembly and creating an inverse phase to the vibration emanating from the open rotor assembly.

The following Clauses provide example configurations of a tail-rotor vibration dampener system, as disclosed herein.

Clause 1: a tail-rotor vibration dampener system for an aircraft, the system comprising: a fuselage; an open rotor assembly including: a powerplant operable to provide an output torque; and a set of rotor blades receiving the output torque and concentrically rotating about a longitudinal axis of the open rotor assembly; at least one actuator unit connecting the open rotor assembly to the fuselage, the actuator unit including: a hydraulic actuator controlling a position of the open rotor assembly in relation to the fuselage; and a dampening device operable to cancel a vibration emanating from the open rotor assembly; and a computerized vibration dampening controller, including programming to: determine a frequency of the vibration emanating from the open rotor assembly; and control the dampening device to cancel the vibration emanating from the open rotor assembly based upon the frequency.

Clause 2: the tail-rotor vibration dampener system of Clause 1, wherein the dampening device includes an electrically activated hydraulic solenoid operable to create canceling vibrations within hydraulic fluid of the hydraulic actuator.

Clause 3: the tail-rotor vibration dampener system of Clause 2, wherein the canceling vibrations are controlled to the frequency of the vibration emanating from the open rotor assembly and to an opposite phase of the vibration emanating from the open rotor assembly.

Clause 4: the tail-rotor vibration dampener system of Clause 1, wherein the dampening device includes an electrically activated linear actuator operable to create canceling vibrations within hydraulic fluid of the hydraulic actuator.

Clause 5: the tail-rotor vibration dampener system of Clause 4, wherein the canceling vibrations are controlled to the frequency of the vibration emanating from the open rotor assembly and to an opposite phase of the vibration emanating from the open rotor assembly.

Clause 6: the tail-rotor vibration dampener system of Clause 1, further comprising a plurality of actuator units connecting the open rotor assembly to the fuselage.

Clause 7: the tail-rotor vibration dampener system of Clause 6, wherein each of the plurality of actuator units includes a dampening device.

Clause 8: the tail-rotor vibration dampener system of Clause 1, further comprising a sensor operable to monitor the vibration emanating from the open rotor assembly; and wherein the computerized vibration dampening controller operating programming to determine the frequency of the vibration emanating from the open rotor assembly includes programming to monitor the sensor.

Clause 9: the tail-rotor vibration dampener system of Clause 8, wherein the sensor is disposed within the open rotor assembly.

Clause 10: the tail-rotor vibration dampener system of Clause 8, wherein the sensor is disposed upon a piston arm connected to the actuator unit.

Clause 11: the tail-rotor vibration dampener system of Clause 1, further comprising a sensor operable to monitor a resulting vibration in the fuselage; and wherein the computerized vibration dampening controller further operates programming to tune the dampening device based upon minimizing the resulting vibration in the fuselage.

Clause 12: a tail-rotor vibration dampener system for an aircraft, the system comprising: a fuselage; an open rotor assembly including: a powerplant operable to provide an output torque; and a set of rotor blades receiving the output torque and concentrically rotating about a longitudinal axis of the open rotor assembly; a sensor operable to monitor a vibration emanating from the open rotor assembly; at least one actuator unit connecting the open rotor assembly to the fuselage, the actuator unit including: a hydraulic actuator controlling a position of the open rotor assembly in relation to the fuselage; and an electrically activated hydraulic solenoid creating a vibration within hydraulic fluid of the hydraulic actuator and operable to cancel the vibration emanating from the open rotor assembly; and a computerized vibration dampening controller, including programming to: determine a frequency of the vibration emanating from the open rotor assembly; and control the electrically activated hydraulic solenoid to cancel the vibration emanating from the open rotor assembly based upon the frequency.

Clause 13: the tail-rotor vibration dampener system of Clause 12, further comprising a plurality of actuator units connecting the open rotor assembly to the fuselage.

Clause 14: the tail-rotor vibration dampener system of Clause 13, wherein each of the plurality of actuator units includes a dampening device.

Clause 15: a tail-rotor vibration dampener system for an aircraft, the system comprising: a fuselage; an open rotor assembly including: a powerplant operable to provide an output torque; and a set of rotor blades receiving the output torque and concentrically rotating about a longitudinal axis of the open rotor assembly; a sensor operable to monitor a vibration emanating from the open rotor assembly; at least one actuator unit connecting the open rotor assembly to the fuselage, the actuator unit including: a hydraulic actuator controlling a position of the open rotor assembly in relation to the fuselage; and an electrically activated linear actuator controlling an overall length of the actuator unit and operable to cancel the vibration emanating from the open rotor assembly; and a computerized vibration dampening controller, including programming to: determine a frequency of the vibration emanating from the open rotor assembly; and control the electrically activated linear actuator to cancel the vibration emanating from the open rotor assembly based upon the frequency.

Clause 16: the tail-rotor vibration dampener system of Clause 15, further comprising a plurality of actuator units connecting the open rotor assembly to the fuselage.

Clause 17: the tail-rotor vibration dampener system of Clause 16, wherein each of the plurality of actuator units includes a dampening device.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A tail-rotor vibration dampener system for an aircraft, the system comprising:
   a fuselage;
   an open rotor assembly including:
      a powerplant operable to provide an output torque; and
      a set of rotor blades receiving the output torque and concentrically rotating about a longitudinal axis of the open rotor assembly;
   at least one actuator unit connecting the open rotor assembly to the fuselage, the actuator unit including:
      a hydraulic actuator controlling a position of the open rotor assembly in relation to the fuselage; and
      a dampening device operable to cancel a vibration emanating from the open rotor assembly; and
   a computerized vibration dampening controller, including programming to:
      determine a frequency of the vibration emanating from the open rotor assembly; and
      control the dampening device to cancel the vibration emanating from the open rotor assembly based upon the frequency, wherein the dampening device includes an electrically activated hydraulic solenoid operable to create canceling vibrations within hydraulic fluid of the hydraulic actuator and the canceling vibrations are controlled to the frequency of the vibration emanating from the open rotor assembly and to an opposite phase of the vibration emanating from the open rotor assembly.

2. The tail-rotor vibration dampener system of claim 1, further comprising a plurality of actuator units connecting the open rotor assembly to the fuselage.

3. The tail-rotor vibration dampener system of claim 2, wherein each of the plurality of actuator units includes a dampening device.

4. The tail-rotor vibration dampener system of claim 1, further comprising a sensor operable to monitor the vibration emanating from the open rotor assembly; and
   wherein the computerized vibration dampening controller including programming to determine the frequency of the vibration emanating from the open rotor assembly includes programming to monitor the sensor.

5. The tail-rotor vibration dampener system of claim 4, wherein the sensor is disposed within the open rotor assembly.

6. The tail-rotor vibration dampener system of claim 4, wherein the sensor is disposed upon a piston arm connected to the actuator unit.

7. The tail-rotor vibration dampener system of claim 1, further comprising a sensor operable to monitor a resulting vibration in the fuselage; and
   wherein the computerized vibration dampening controller further includes programming to tune the dampening device based upon minimizing the resulting vibration in the fuselage.

8. A tail-rotor vibration dampener system for an aircraft, the system comprising:
   a fuselage;
   an open rotor assembly including:
      a powerplant operable to provide an output torque; and
      a set of rotor blades receiving the output torque and concentrically rotating about a longitudinal axis of the open rotor assembly;
   a sensor operable to monitor a vibration emanating from the open rotor assembly;
   at least one actuator unit connecting the open rotor assembly to the fuselage, the actuator unit including:
      a hydraulic actuator controlling a position of the open rotor assembly in relation to the fuselage; and
      an electrically activated hydraulic solenoid creating a canceling vibration within hydraulic fluid of the hydraulic actuator and operable to cancel the vibration emanating from the open rotor assembly; and
   a computerized vibration dampening controller, including programming to:
      determine a frequency of the vibration emanating from the open rotor assembly; and
      control the electrically activated hydraulic solenoid to cancel the vibration emanating from the open rotor assembly based upon the frequency, wherein the canceling vibrations are controlled to the frequency of the vibration emanating from the open rotor assembly and to an opposite phase of the vibration emanating from the open rotor assembly.

9. The tail-rotor vibration dampener system of claim 8, further comprising a plurality of actuator units connecting the open rotor assembly to the fuselage.

10. The tail-rotor vibration dampener system of claim 9, wherein each of the plurality of actuator units includes a dampening device.

* * * * *